Aug. 13, 1968 R. T. METCALFE 3,396,425
SPECTACLE HINGE
Filed Dec. 28, 1966

INVENTOR.
RICHARD T. METCALFE
BY J. Albert Hultquist
ATTORNEY

United States Patent Office 3,396,425
Patented Aug. 13, 1968

3,396,425
SPECTACLE HINGE
Richard T. Metcalfe, Sturbridge, Mass., assignor, by mesne assignments, to American Optical Company, Southbridge, Mass., a corporation of Delaware
Filed Dec. 28, 1966, Ser. No. 605,444
10 Claims. (Cl. 16—128)

ABSTRACT OF THE DISCLOSURE

One of a pair of spectacle hinge leaves is provided with an internally threaded pivot post and the other with a hollow internally tapered barrel. Fitted over the pivot post is a resilient conical bushing permanently held there in place by a headed optical screws partially threaded into the post. Assembly of the leaves is effected simply by dropping the internally tapered barrel over the conical bushing and tightening the screw sufficiently to cause its head to flange or upset one end of the bushing partially into the barrel. Disassembly of the leaves requires only loosening of the screw without removal from the post and lifting of the barrel off the bushing.

Background of the invention (1) The field of the invention is that of spectacle hinges and the invention relates more particularly to a novel and improved construction for hinging temples to lens supporting front sections of ophthalmic mountings, sunglasses, goggles and the like.

(2) Prior art designs in spectacle hinges generally include interleaved hinge barrels through which a screw or other form of pintle is inserted and tightened to the point where frictional interference between faces of the barrels will prevent dropping of the temples under their own weight. Various devices for preventing temple drop without complete reliance upon interfacial friction between the hinge barrels have included the use of washers and/or bushings of either rigid, compressible or expansible metallic or non-metallic materials which directly surround or are otherwise similarly associated with the hinge screw or pintle. In all known prior art spectacle hinge constructions, there are the disadvantages of the manufacturers' having to hold close manufacturing tolerances in order to assure proper mating and operation of the interleaved assemblies and their having to stock, package and distribute, along with the main hinge components, a number of loose parts (e.g. screws, washers, bushings and the like) and often special tools to ophthalmic practitioners in the field who, as it is recognized, do most of the assembling operations especially in the line of ophthalmic spectacles where custom fitting is required. Heretofor a considerable amount of time has been spent in assembling and adjusting hinge connections for proper fitting either at the factory or in the field. The results from the need to handling loose hinge connecting components which, being necessarily very small, are difficult to insert and align in the hinges and are susceptible to the stripping of threads, breakage or other damage.

Summary of the invention

This invention provides a spectacle hinge construction of simple and inexpensive but highly effectual design which obviates the need for conventional interleaved hinge barrels, separable connecting means, time consuming manufacturing and assembling operations and special tools for making the assemblies and/or making subsequent adjustments, repair or replacement of parts thereof.

The present hinge construction comprises a pair of hinge leaves from one of which there is extended a short arm carrying an internally threaded pivot post. The post is surrounded by a conical bushing of resilient plastic material, or its equivalent, permanently held in place by a headed optical screw which is partially threaded into the post. Formed as an integral part of the other of said hinge leaves is a single internally tapered hinge barrel adapted to drop over the screw, bushing and post assembly into mating relationship with the bushing.

Without loose screws, bushings or other conventional hinge components, and with no more than the need for a common screw driver, assembly of the subject hinge is accomplished by dropping the internally tapered barrel of one hinge leaf over the post, screw and bushing of the other leaf and tightening the screw. When tightened (advanced further into the post) the head of the screw causes a portion of the immediately adjacent end of the bushing to flange or be upset into an enlargement of the opening in the hinge barrel. This prevents withdrawal of the barrel and permanently pivotally secures the two leaves together. At any time thereafter disassembly of the hinge leaves may be accomplished simply by loosening the screw and lifting the barrel off the bushing. The inherent resiliency of this bushing causes it to return to its cylindrical shape at its upper end so that the barrel may be lifted off with little or no interference.

Description of the preferred embodiment

Figure 1:
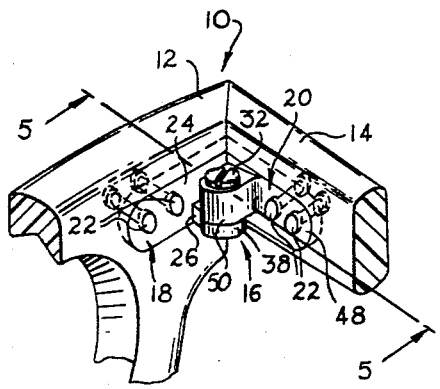
FIG. 1 shows, in enlarged perspective, an embodiment of the invention applied to an exemplary spectacle endpiece wherein front and temple portions of the endpiece are broken away.

Referring now to FIG. 1 there is shown spectacle endpiece 10 which, in recognized fashion, includes the temporal end portions of a lens supporting spectacle front 12 and temple 14. Pivotally interconnecting front 12 and temple 14 is hinge 16, the illustrated form of which is not to be interpreted as being restrictive of the invention but only demonstrative of the essential improvement which distinguishes this invention from the prior art.

Hinge 16 comprises leaves 18 and 20 which may be affixed to spectacle front 12 and temple 14 respectively in any ordinary manner such as with pins or rivets 22 shown in FIG. 1. Leaves 18 and 20 may be recessed into endpiece 10 in the manner illustrated or not, as desired.

Hinge leaf 18 includes plate 24, laterally extending arm 26 and upstanding cylindrical pivot post 28. Post 28 is longitudinally drilled and tapped (see FIGS. 2 and 3) to threadedly receive optical screw 30 having head 32. Plate 24, arm 26 and post 28 may be cast and/or machined in the form of a single piece of metal stock or they may be formed as individual pieces and thereafter welded, brazed or otherwise secured together as a unit.

Figure 2:
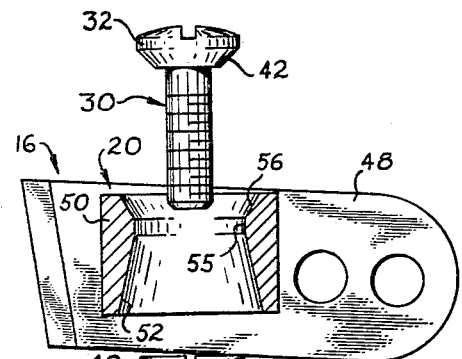
FIG. 2 is a greatly enlarged vertical cross-sectional view of the improved spectacle hinge of the present invention with component parts thereof separated from each other for clarity of illustration.
Figure 3:
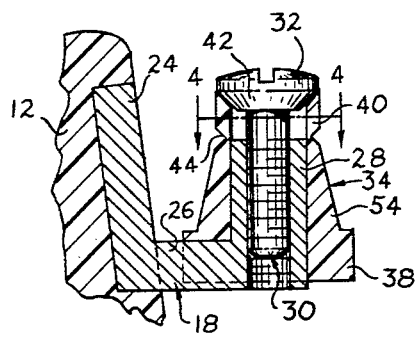
FIG. 3 is a similarly enlarged vertical cross-sectional view of one leaf of said hinge with component parts thereof assembled.

Fitted snugly over post 28 is conical bushing 34 formed of a relatively rigid but resilient material such as nylon or a polypropylene plastic. Bushing 34 is provided with radial slot 36 (see FIG. 2) in the lowermost portion 38 thereof. Slot 36 receives arm 26 and keys the bushing against rotation on post 28 (see FIGS. 2 and 3). Extension 40 of bushing 34, in addition to being straight-sided as best seen in FIGS. 2 and 3, is inwardly tapered at its outer end so as to intimately receive chamfered portion 42 of screw head 32 when screw 30 is threaded into post 28 as illustrated in FIG. 3.

Figure 4:
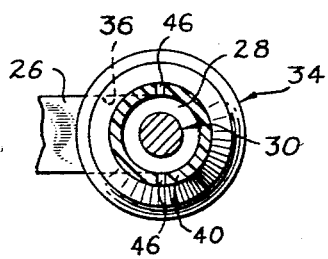
FIG. 4 is a transverse cross-sectional view taken generally along line 4—4 of FIG. 3.

Section 40 of bushing 34, being intended to flange or be upset outwardly when assembled with hinge leaf 20 as will be described in detail hereinafter, is thinned in cross-section by circumferential V-groove 44 (FIGS. 2 and 3) and provided with vertical slots 46 (see FIGS. 2 and 4) to facilitate such flanging or overturning thereof. As supplied to spectacle frame assemblers in the field or factory, however, hinge leaf 18 is delivered with section 40 of bushing 34 not folded but permanently held in place on post 28 by screw 30 substantially as illustrated in FIG. 3. As such, screw 30 is threaded into post 28 to the extent that head 32 makes firm but light contact with the inwardly tapered upper end of section 40 of bushing 34.

Hinge leaf 20 comprises plate 48 having laterally extending hinge barrel 50. The lowermost internal section 52 of barrel 50 is conically tapered so as to match in size, angle and direction the taper of section 54 of bushing 34. The minimum internal diameter of barrel 50, throughout a short cylindrical mid-section 55 thereof (see FIG. 2), is such as to freely receive section 40 of bushing 34. Above mid-section 55, barrel 50 is provided with an internal chamfer 56 tapering oppositely in direction to that of section 52.

Figure 5:
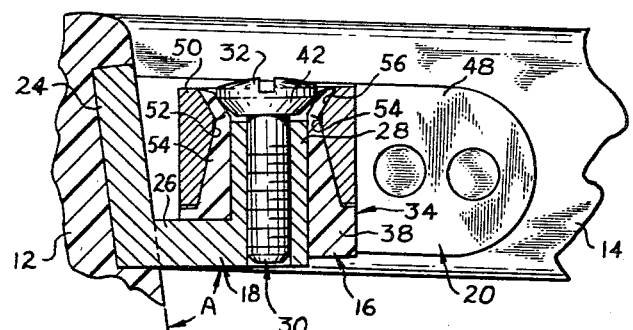
FIG. 5 is a vertical cross-sectional view of the completed hinge assembly taken generally along line 5—5 of FIG. 1.

Hinge leaves 18 and 20, usually already riveted or otherwise attached to the respective front 12 and temple 14 portions of a spectacle when they are received by an assembler, are assembled as follows:

Barrel 50 of leaf 20 is simply dropped over bushing 34 of leaf 18 and screw 30 is tightened to the point where, with smooth pivotal action, sufficient frictional interference between bushing 34 and barrel 50 is effected to prevent dropping of the temple under its own weight. Such tightening of screw 30 moves head 32 thereof into section 40 of bushing 34 causing the two halves thereof formed by slots 46 to fold outwardly against corresponding opposite sides of chamfer 56 in barrel 50 as illustrated in FIG. 5. Thus, barrel 50 of hinge leaf 20 is locked to pivot post 28 of hinge leaf 18 through the intermediary of extension 40 of bushing 34. Bushing 34 being keyed against rotation on post 28 and screw 30 making no contact whatever with barrel 50 is not affected (i.e. loosened or tightened) by pivotal action of hinge 16. Adjustment either to loosen or tighten the pivotal action of hinge 16 may be effected during, or at any time after, assembly thereof simply by turning screw 30 with an ordinary screw driver.

Disassembly of hinge 16 for changing, repairing, or effecting replacement of temple 16 may be accomplished simply by turning screw 30 only partially out of post 28, i.e. back to approximately the position shown in FIG. 3, and lifting barrel 50 off bushing 34. In so doing, section 40 of bushing 34 will be returned to substantially its initial erect position upon passing through section 55 of barrel 50. Thus, with section 40 once again in an erect position, hinge 16 may be reassembled with the same or a replacement temple.

Another feature of the present construction is that of its being easily adjustable for setting a desired angle A (FIG. 3) of pantoscopic tilt between front 12 and temple 14. This requires only the bending of arm 26 of leaf 18 rather than having to effect the usual bending adjustment of all ears of prior art interleaved hinge barrels at the risk of causing misalignment thereof. In the present case, adjustment of spectacle pantoscopic tilt angle has no affect whatever upon pivotal action of the hinge. Heretofor, however, such adjustment was attended by a high incidence of breakage and problems of introducing excessive binding and roughness in the pivotal action of the hinge.

I claim:

1. A spectacle hinge having a pair of articulated hinge leaves each including a hinge plate attachable to a spectacle endpiece wherein the improvement comprises:
   An arm integral with and extending from one of said leaves, said arm having at its distal end an upstanding internally threaded pivot post;
   a bushing surrounding said post;
   a headed screw threaded into said post with the head thereof engaging one end of said bushing whereby the bushing is permanently held in place on said post; and
   a hinge barrel on the other of said hinged leaves adapted to removably fit over the combination of said post, bushing and screw and pivot on said bushing.

2. A spectacle hinge as recited in claim 1 wherein a section of said bushing adjacent said one end thereof is adapted to flange outwardly when said head of said screw is forced thereinto by advanced threading into said post and said hinge barrel is internally chamfered to receive said section, when so flanged, to thereby releasably pivotally secure said pair of hinge leaves together.

3. A spectacle hinge as recited in claim 2 wherein said section of said bushing is slotted to facilitate said flanging thereof.

4. A spectacle hinge as recited in claim 2 wherein the major portions of the lengths of said bushing and hinge barrel are respectively externally and internally tapered to matching degree and size.

5. A spectacle hinge as recited in claim 1 wherein said bushing is keyed against rotation on said pivot post.

6. A spectacle hinge as recited in claim 5 wherein said keying of said bushing is effected by the provision of a slot in said bushing into which said arm is closely interfitted.

7. A spectacle hinge as recited in claim 2 wherein said bushing is keyed against rotation on said pivot post.

8. A spectacle hinge as recited in claim 3 wherein said bushing is keyed against rotation on said pivot post.

9. A spectacle hinge as recited in claim 4 wherein said bushing is keyed against rotation on said pivot post.

10. A spectacle hinge as recited in claim 2 wherein said bushing is keyed against rotation on said pivot post by the provision of a slot in said bushing into which said arm of said one hinge leaf is closely interfitted.

References Cited

UNITED STATES PATENTS

| | | |
|---|---|---|
| 1,150,114 | 8/1915 | Hays. |
| 1,608,674 | 11/1926 | Schumacher _____ 351—141 |
| 2,301,287 | 11/1942 | Kirk et al. _____ 351—146 |
| 2,678,545 | 5/1954 | Ellis. |
| 2,682,199 | 6/1954 | Weissman _____ 351—140 |
| 2,828,668 | 4/1958 | Angelis. |
| 2,939,168 | 6/1960 | Ferron. |

FOREIGN PATENTS 633,370   12/1961   Canada.

BOBBY R. GAY, *Primary Examiner.*